United States Patent
Goto

(10) Patent No.: US 8,390,967 B2
(45) Date of Patent: Mar. 5, 2013

(54) WIRING DEVICE HAVING LEAKAGE DETECTION FUNCTION

(75) Inventor: Kiyoshi Goto, Amagasaki (JP)

(73) Assignee: Panasonic Corporation, Osaka (JP)

( * ) Notice: Subject to any disclaimer, the term of this patent is extended or adjusted under 35 U.S.C. 154(b) by 127 days.

(21) Appl. No.: 13/000,119

(22) PCT Filed: Jul. 2, 2009

(86) PCT No.: PCT/JP2009/062097
§ 371 (c)(1),
(2), (4) Date: Dec. 20, 2010

(87) PCT Pub. No.: WO2010/001950
PCT Pub. Date: Jan. 7, 2010

(65) Prior Publication Data
US 2011/0110003 A1   May 12, 2011

(30) Foreign Application Priority Data
Jul. 2, 2008 (JP) .................................. 2008-173082

(51) Int. Cl.
*H02H 3/16* (2006.01)
(52) U.S. Cl. ........................................................ 361/42
(58) Field of Classification Search .................. 361/42
See application file for complete search history.

(56) References Cited

U.S. PATENT DOCUMENTS

| 6,977,518 | B2 | 12/2005 | Higashihama et al. |
| 7,446,549 | B2 | 11/2008 | Tomita et al. |
| 7,643,608 | B2 | 1/2010 | Yukisada et al. |
| 2001/0036048 | A1 * | 11/2001 | Goto et al. ........................ 361/42 |

FOREIGN PATENT DOCUMENTS

| EP | 0 464 516 | 6/1991 |
| JP | 61-9120 | 1/1986 |
| JP | 4-271225 | 9/1992 |
| JP | 10-042457 | 2/1998 |
| JP | 2001-268779 | 9/2001 |
| JP | 2005-108607 | 4/2005 |
| JP | 2006-048958 | 2/2006 |
| WO | 2008/069249 | 6/2008 |

OTHER PUBLICATIONS

International Search Report for corresponding PCT/JP2009/062097, mailing date of Jul. 28, 2009.
Dalziel C.F. Aiee, "A Threshold Value of Perception Currents", American institute of Electrical Engineers, 1954, PP. Part III-B, pp. 990 to 996.

* cited by examiner

*Primary Examiner* — Stephen W Jackson
*Assistant Examiner* — Angela Brooks
(74) *Attorney, Agent, or Firm* — Greenblum & Bernstein, P.L.C.

(57) ABSTRACT

A wiring device includes a leakage control unit for detecting a leakage current flowing through an electrical path connecting a commercial power supply and a load to perform a leakage determination and a switching unit for interrupting the electrical path in accordance with the leakage determination of the leakage control unit The leakage control unit has a filter for filtering the detected leakage, a square operation unit for calculating the square operation value of a signal which relates to the leakage current passing through the filter, and a threshold determination unit for performing the leakage determination in accordance with the square operation value obtained by the square operation unit. Consequently, the leakage determination is performed in accordance with the square operation value, so that the leakage can be detected with high accuracy even when the leakage current has a distorted waveform, and the electrical leakage can be reliably interrupted.

7 Claims, 10 Drawing Sheets

○ ··· DATA BY DALZIEL
SOLID LINE ··· DATA DESCRIBED IN IEC 479
DOTTED LINE ···REVERSE CHARACTERISTIC IN INPUT/OUTPUT TRANSFER FUNCTION OF R-C CIRCUIT NETWORK DESCRIBED IN IEC 990

FIG.9A PRIOR ART  LEAKAGE CURRENT

FIG.9B PRIOR ART  MINUS SIDE

FIG.9C PRIOR ART  PLUS SIDE

FIG.9D PRIOR ART  TRIP SIGNAL

WIRING DEVICE HAVING LEAKAGE DETECTION FUNCTION

FIELD OF THE INVENTION

The present invention relates to a wiring device which has a leakage detection function for detecting an electrical leakage to interrupt an electrical path between a commercial power supply and a load and cutting off the electrical leakage.

DESCRIPTION OF THE RELATED ART

Conventionally, a wiring device such as an electrical outlet used in a wet location or outside is provided with a leakage detection function to ensure an electrical safety. The leakage detection function is also added to a master breaker in standard homes, and a leakage detection level is set to approximately 30 mA, for example. In this type of master breaker, a time or number of signals which exceed a leakage detection threshold value is counted to control the electrical leakage so that a malfunction caused by a noise, such as a thunder surge, which travels through a leading wire, for example, is prevented.

A conventional example of the wiring device having the above leakage detection function is described with reference to FIGS. 7 to 9D. In FIG. 7, a wiring device 100 is inserted between a commercial power supply of single-phase three-wire system and a load 120, and more particularly, it is connected to a part of an electrical path which has passed through a branch breaker 140 via a master breaker 130, which is connected to electrical paths (a power supply lines L1 and L2, and a neutral line N) from the commercial power supply.

As shown in FIG. 8, the wiring device 100 includes a switching unit 101 which is inserted into the electrical paths (the power supply line L1 and the neutral line N), a zero-phase-sequence current transformer 102 which detects a leakage current flowing in the electrical paths, and a leakage control unit 103 which opens the switching unit 101 in accordance with the detected leakage current. The leakage control unit 103 has a low-pass filter 131, a threshold determination unit 132 which performs the leakage current determination, a counter 133 which counts a determination signal, and a leakage judgment unit 134 which performs the electrical leakage determination in accordance with the number of counts.

FIGS. 9A to 9D show various signal waveforms for describing an operation of the above wiring device 100. The threshold determination unit 132 detects plus and minus sides of the leakage current, which is detected by the zero-phase-sequence current transformer 102 and passes through the filter 131, and the number of detection outputs which exceed the threshold value is counted, and when the number reaches a predetermined number of counts (three times here), it is determined that the electrical leakage occurs, a trip signal is outputted, and the switching unit 101 is opened.

Another example of the leakage control unit 103 is shown in FIG. 10. In the leakage control unit 103, the detected leakage current by the zero-phase-sequence current transformer 102 is filtered by the filter 131, the output from the filter 131 is rectified in a rectifier 135, and the electrical leakage determination is performed in the leakage judgment unit 134 by comparing an average value which is obtained by integrating the rectified output in an integration unit 136 to a predetermined value. There is a known electrical outlet which has a leakage interruption function and a leakage detection sensitivity of 15 mA.

Moreover, there is a known electrical outlet with plug blades and a leakage breaker having a zero-phase-sequence current transformer, the current transformer detects an output current of a sensor which detects a spark discharge occurring between the plug blades and opens the leakage breaker (refer to Japanese Laid-Open Patent Publication No. 2006-48958, for example).

However, as shown in FIG. 11, the leakage current becomes complicated signals of large waveform distortion due to an increase of inverter load, for example, so that in the example shown in FIG. 8, the necessary detection waveform cannot be counted accurately, and a leakage detection accuracy is thereby reduced. Moreover, in the example shown in FIG. 10, when the distortion of the leakage current increases, the average value gets low compared to an effective value, so that sensitivity in the leakage detection is reduced. Consequently, in the above cases, the leakage detection accuracy is reduced when the leakage current has the large waveform distortion, so that the leakage cannot be interrupted reliably, and they may cause an undesirable operation in protecting a human body from electrical shock.

Moreover, the electrical outlet of 2006-48958 relates to a technique of responding to an instant leakage current such as the spark discharge, so that the low-pass filter cannot be used, and it has little feature of protecting the human body from the electrical shock caused by a normal leakage current.

SUMMARY OF THE INVENTION

The present invention is to solve the problem described above, and an object of the present invention is to provide a wiring device which has a leakage detection function for interrupting an electrical leakage reliably even when the leakage current has a distorted waveform.

According to an aspect of the present invention, this object is achieved by a wiring device which has a leakage detection function and is located between a commercial power supply and a load, comprises: a leakage determination unit for detecting a leakage current flowing through an electrical path connecting the commercial power supply and a load to perform a leakage determination; and a switching unit for interrupting the electrical path in accordance with the leakage determination of the leakage determination unit, wherein the leakage determination unit further comprises a filter for filtering a detected leakage current and having a frequency characteristic which a human body has with respect to an electrical shock, an operation unit for calculating a square operation value of a signal passing through the filter, and a determination unit for performing the leakage determination by comparing the square operation value obtained by the square operation unit to a preset threshold value.

According to an aspect of the present invention, the leakage determination is performed in accordance with the square operation value of the signal which relates to the leakage current passing through the filter, so that the detection level is not lowered even when the leakage current has a distorted waveform. As a result, the leakage detection can be performed with higher accuracy, and the electrical leakage can reliably be interrupted.

It is preferable that the filter has a DC (direct-current) cut function and is made up of a capacitor and a resistor. According to the above configuration, the DC of the output signal in the filter is cut off, so that the input signal which has passed through the filter does not have a DC offset. Consequently, the DC offset does not have influence on the leakage determination, the leakage detection accuracy is improved, and in addition, a circuit for adjusting the offset becomes unnecessary, so that the wiring device can be manufactured at low cost.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
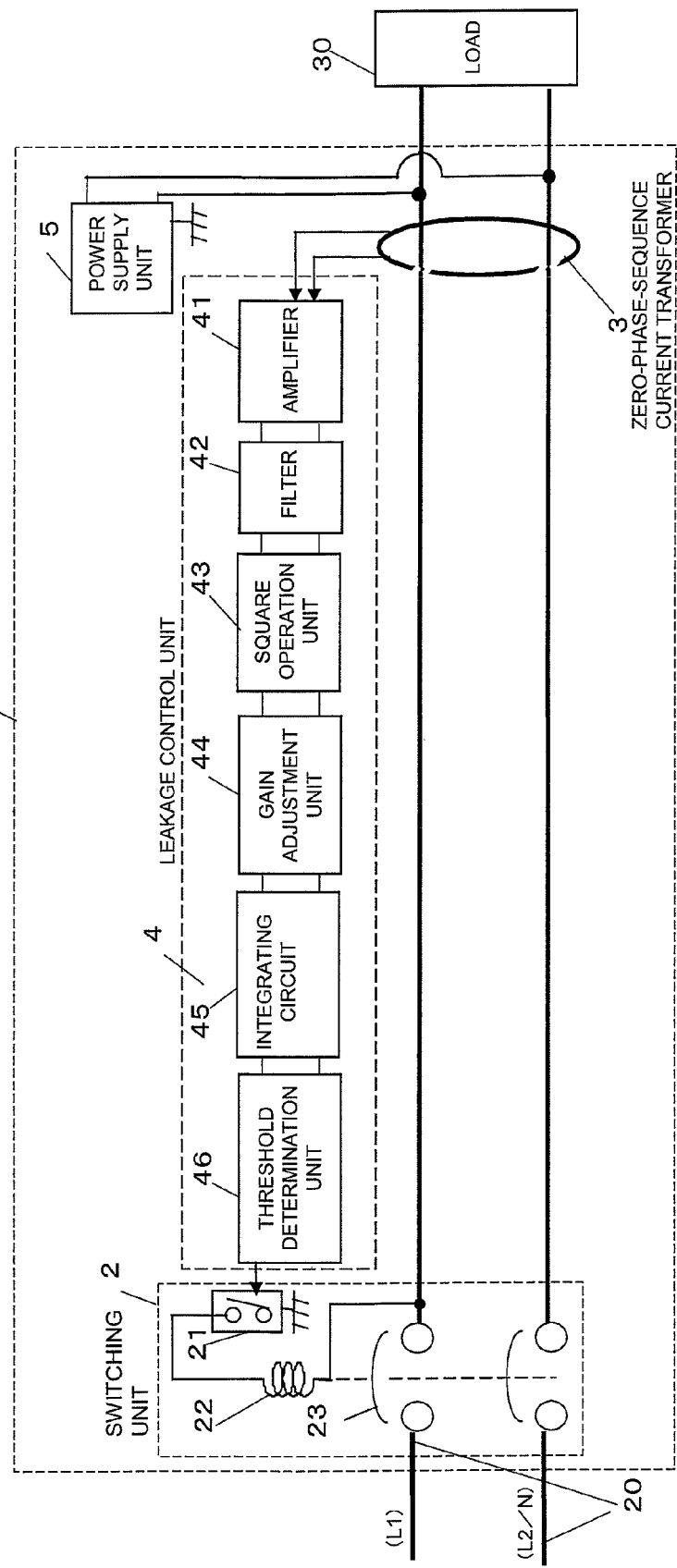
FIG. 1 is a configuration diagram of a wiring device according to a first preferred embodiment of the present invention.

A wiring device having a leakage detection function (abbreviated as the present wiring device hereinafter) according to the first preferred embodiment of the present invention is described with reference to FIGS. 1 to 3. As shown in FIG. 1, a present wiring device 1 includes a switching unit 2 for interrupting an electrical path between a commercial power supply and a load 30, a zero-phase-sequence current transformer 3 (hereinafter refer to the current transformer 3) for detecting a leakage current flowing through an electrical path 20 connecting the switching unit 2 and the load 30, a leakage control unit (leakage determination unit) 4 for controlling the switching unit 2 in accordance with the detected leakage current, and a power supply unit 5 for forming DC (direct-current) electricity from the commercial power supply and providing the power supply to the various unit. The present wiring device 1, which is located between the commercial power supply and the load, is mounted on a breaker, an electrical outlet, a power strip, an extension cord, for example. Here, the commercial power supply is connected to the switching unit 2 via the electrical path 20, which includes single-phase two wires among single-phase three wires of power supply lines L1 and L2 and a neutral line N. The electrical path 20 is not limited to the single-phase two wires.

The switching unit 2 includes a switch 21 having a switch element such as a thyristor, for example, an exciting coil 22 of releasing relay system connected in series with the switch 21, and a contact 23 which is opened by an excitation of the exciting coil 22. The switching unit 2 is usually closed, and when the switch 21 is turned on by a leakage control signal from the leakage control unit 4, the exciting coil 22 is excited, and a latch of the contact 23 is released and opened. As a result, the electrical path 20 leading to the load 30 is interrupted.

The current transformer 3 is located so that the electrical path 20 passes through a coil of the current transformer 3 and detects the leakage current flowing in the electrical path 20, and when the electrical leakage occurs in the electrical path 20, the current transformer 3 provides the detected leakage current to the leakage control unit 4.

The leakage control unit 4 includes an amplifier 41 which amplifies differentially the leakage current provided from the zero-phase-sequence current transformer 3, a filter 42 which filters an output signal of the amplifier 41, a square operation unit 43 which performs a square operation on the output signal from the filter 42, a gain adjustment unit 44 which performs a gain adjustment of the square operation output, an integrating circuit 45 which integrates the square operation output on which the gain adjustment is performed, and a threshold determination unit 46 which compares the integration output to a predetermined threshold voltage E1 to perform the leakage determination.

Figure 2:
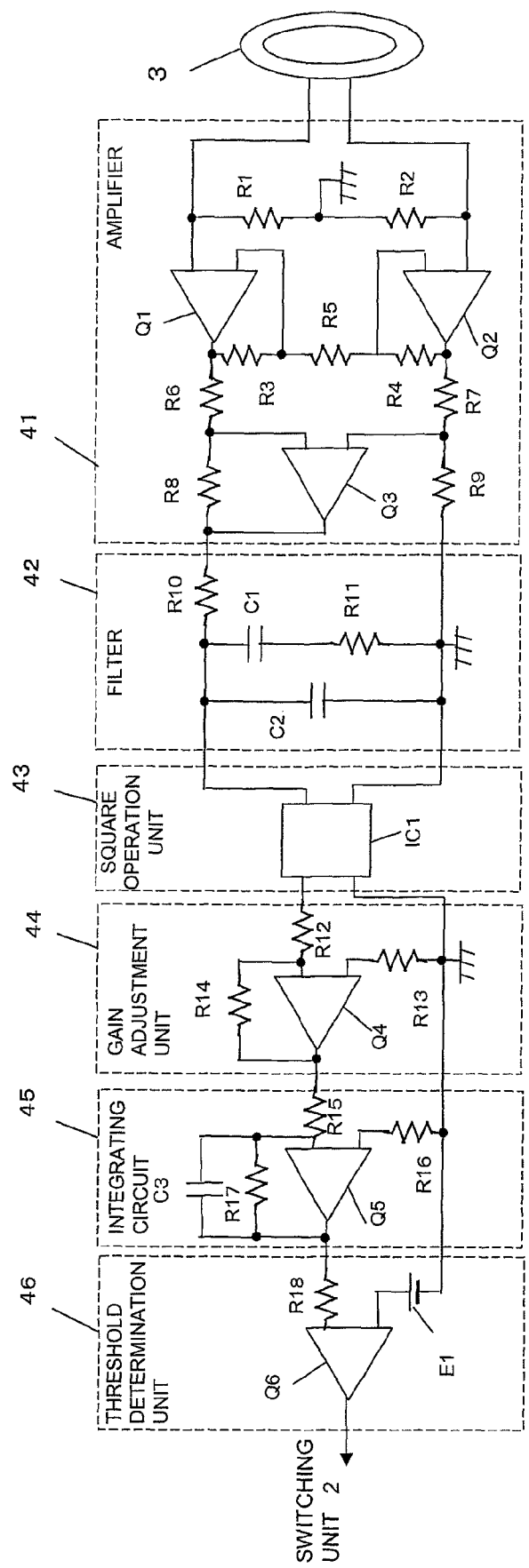
FIG. 2 is a configuration diagram of a leakage control unit in the wiring device in FIG. 1.
Figure 3:
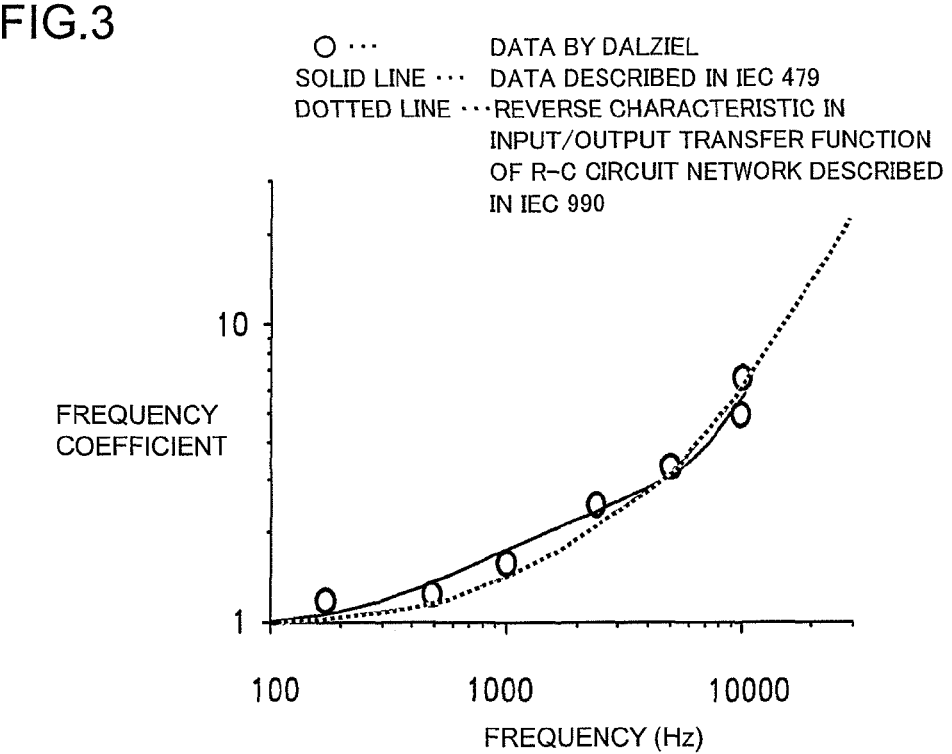
FIG. 3 is a diagram for describing a frequency characteristic of a human body with respect to an electrical shock.

As shown in FIG. 2, the amplifier 41 has operational amplifiers Q1 and Q2 which are connected to both ends of the coil of the current transformer 3 to amplify the leakage current, respectively, and an operational amplifier Q3 to which the respective outputs from the operational amplifiers Q1 and Q2 are inputted and differentially amplified. Here, resistors R1, R2, R6, and R7 are input resistors of the operational amplifiers Q1 and Q2 and resistors R3, R4, R5, and R8 are feed back resistors of the operational amplifiers Q1 and Q2, respectively, and a resistor R9 is an input ground resistor of the operational amplifier Q3. According to the above configuration, the leakage current detected in the zero-phase-sequence current transformer 3 is amplified in the operational amplifiers Q1 and Q2 and further amplified by the differential amplification of the operational amplifier Q3 and then provided to the filter 42 of the next step.

The filter 42, which has a resistor R10 for the filter, a series circuit of a capacitor C1 and a resistor R11 connected between the output side of the resistor R10 and the ground, and a capacitor C2 located in parallel with the series circuit, forms a low pass filter (LPF). The filter 42 removes high-frequency component of the leakage current to avoid an unnecessary operation of the switching unit 2 due to an instant noise and further has a filter characteristic which is close to a frequency characteristic which a human body has with respect to an electrical shock as described below. The basic configuration of the filter 42 only needs to have the resistor R10 and the capacitor C2 at least.

The square operation unit 43 has an integrated circuit IC1 such as a CPU having a calculation function to perform the square operation on the input signal, for example. The square operation unit 43 performs the square operation on the leakage signal inputted from the filter 42 by a software arithmetic processing of the integrated circuit IC1 and inputs the square operation value to the gain adjustment unit 44 of the next step. Moreover, the square operation unit 43 also can perform an arithmetic processing other than the square operation, so that it can also perform an operation to obtain a root-mean-square of an instantaneous value of the leakage signal based on the square operation value to obtain an effective value of the leakage signal.

The gain adjustment unit 44 has an operation amplifier Q4 for amplification, amplifies the square operation value inputted from the above square operation unit 43, and inputs the output to the integrating circuit 45. Here, resistor R12, R13, and R14 are an input resistor, ground resistor, and feed back resistor, respectively. The gain adjustment can be performed here by adjusting a value of the input resistor R12 or feed back resistor R14. Moreover, it is also applicable to mount additionally an adjustable resistor for the gain adjustment on the operational amplifier, for example.

The integrating circuit 45 has an operation amplifier Q5 which integrates the output from the gain adjustment unit 44, an input resistor R15 which connects the operational amplifier Q5 to the gain adjustment unit 44, a ground resistor R16 which grounds one end of the input of the operational amplifier Q5, a feed back resistor R17 of the operational amplifier Q5, and an integration capacitor C3 which is connected in parallel with the resistor R17. According to the above configuration, the input signal from the gain adjustment unit 44 is integrated to reduce the high-frequency component, and the instant variation of the input signal is controlled.

The threshold determination unit 46 has an operational amplifier Q6 which determines an input signal level from the integrating circuit 45, one end of the input of the operational amplifier Q6 is connected to the integrating circuit 45 via an input resistor R18, and the predetermined threshold voltage E1 is applied to other end of the input of the operational amplifier Q6. The threshold determination unit 46 compares the voltage of the input signal from the integrating circuit 45 to the threshold voltage E1, and when the voltage of the input signal is larger than the threshold voltage E1, the threshold determination unit 46 determines that the electrical leakage occurs, generates a leakage control signal, and outputs the leakage control signal to the switch 21 in the switching unit 2. According to the above configuration, the switching unit 2 is opened and the power supply to the load 30 is interrupted. The input signal to the threshold determination unit 46 can be the effective value of the leakage signal, and in this case, the threshold voltage El is also changed.

The above filter 42 is described in detail with reference to FIGS. 3 to 5. FIG. 3 (refer to "A Threshold Value of Perception Currents", by Dalziel. C. F, AIEE (American Institute of Electrical Engineers), part III-B, pp. 990 to 996, issued in 1954) shows a frequency coefficient which is a relative current value for a human body to perceive an electrical shock with respect to the frequency. In a graph of FIG. 3, circles show data by Dalziel, a solid line shows data described in IEC (International Electrotechnical Commission) 479 standard, and a dotted line shows a reverse characteristic in an input/output transfer function of a R-C circuit network described in IEC 990 standard. Generally, a human being has a characteristic that as the current frequency gets higher, the perception of the current lessens. For example, when the frequency coefficient of the leakage current, which has a low-frequency wave of 100 Hz, is 1, the frequency coefficient increases several times in the high-frequency wave of 10 Hz. In this case, the human being has a perception on the current of small value in the low-frequency wave, however, the human being does not have such a perception in the high-frequency wave when the current value is not high enough for the frequency coefficient.

Figure 4:
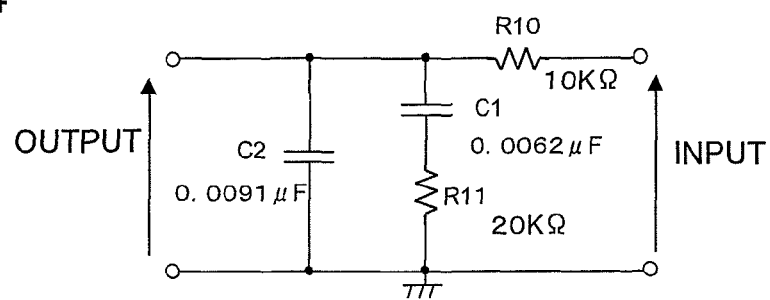
FIG. 4 is an illustrative configuration diagram of a filter in the wiring device in FIG. 1.

FIG. 4 shows the R-C circuit network described in IEC 990 which has the reverse characteristic of the characteristic by Dalziel. The filter 42 (refer to FIG. 2) has a configuration similar to the R-C circuit network and thereby has a filter characteristic which is close to the frequency characteristic which a human body has with respect to the electrical shock, that is, R10=10 KΩ, C1=0.0062 µF, R11=20 KΩ, and C2=0.0091 µF.

Figure 5:
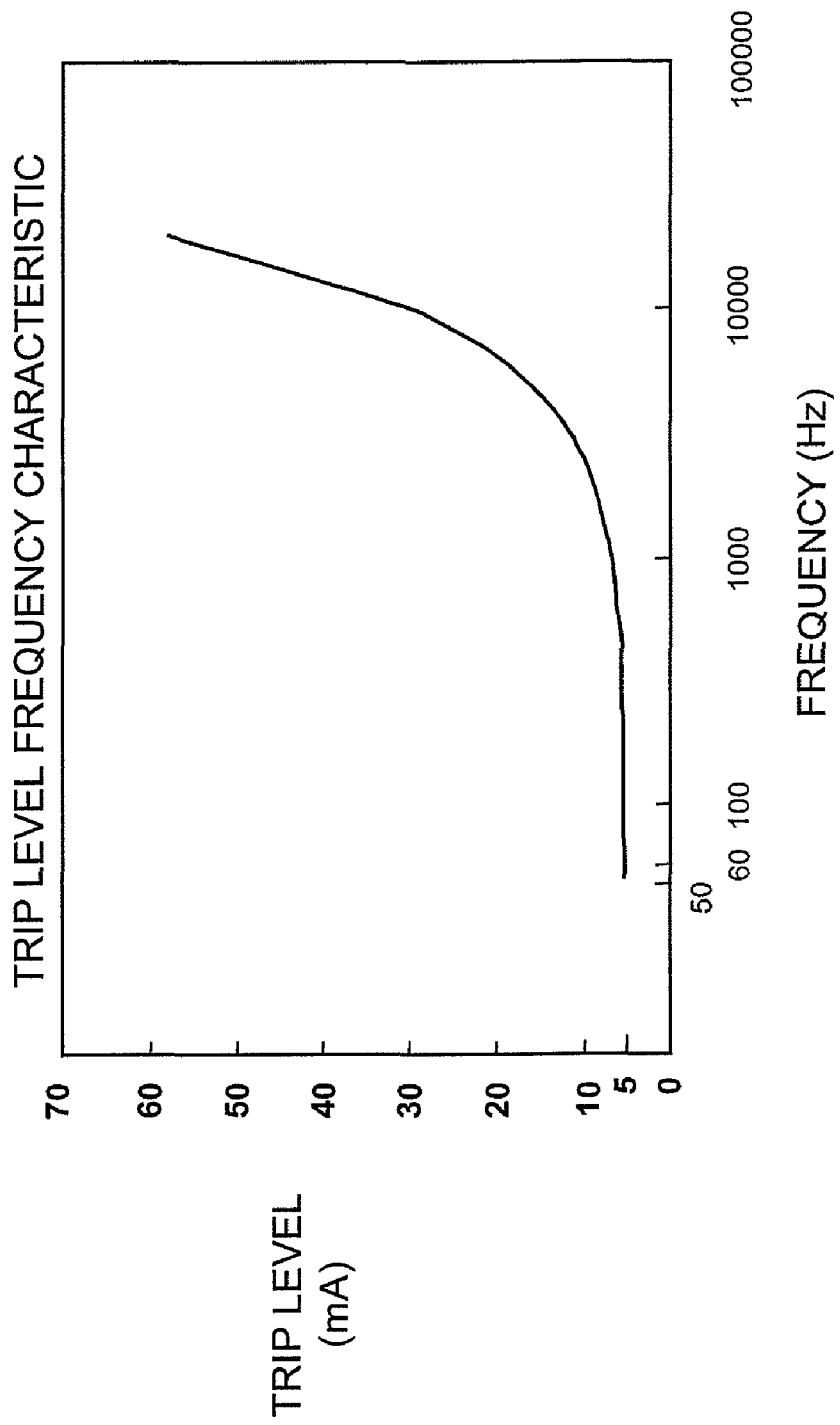
FIG. 5 is a diagram showing a trip level frequency characteristic in the wiring device in FIG. 1.

FIG. 5 shows a trip level frequency characteristic of the leakage current when using the above leakage detection filter of the R-C circuit network. In a graph of FIG. 5, a horizontal axis shows the frequency and a vertical axis shows a trip level to determine the interruption of the electrical path. In the R-C circuit network, the low-frequency wave has larger transfer function. Consequently, the low-frequency wave has high sensitivity and has a trip level of low current value, and the high-frequency wave has lower sensitivity and has a trip level of high current value. Thus, when using the filter having the similar frequency characteristic, the wiring device 1 of the present preferred embodiment trips the switching unit 2 with the small leakage current in case of the low-frequency and trips the switching unit 2 with the relatively large leakage current in case of the high-frequency. For example, the trip level is approximately 5 mA in case that the frequency is a power-supply frequency (50 Hz and 60 Hz) to 100 Hz, so that when the leakage current exceeds the above trip level, the electrical path 20 is interrupted. The trip level gets higher as the frequency gets higher and also gets higher based on the frequency coefficient. The trip level is set to have a certain level tolerance to the electrical shock.

When the electrical leakage occurs in the load 30 side, for example, in the present wiring device 1 having the above configuration, the leakage signal detected in the zero-phase-sequence current transformer 3 is inputted to the square operation unit 43 via the filter 42, and the square operation unit 43 performs the square operation on the leakage signal and converts it into a square value of the leakage signal. The square operation value of the leakage signal equivalently corresponds to an energy value of the leakage current, so that even in case of the leakage current having the large waveform distortion (the leakage current including a composite frequency component), the leakage current detection level can be obtained without influence from the waveform in contrast to the average value detection. Consequently, the detection level of the leakage signal gets higher than the conventional detection level using the average value, and the detection sensitivity level is thereby improved. Also, when the electrical leakage is determined based on the effective value of the leakage signal in the threshold determination unit 46, the leakage current detection level is not influenced by the waveform distortion, so that the leakage current detection level gets higher than the case of using the average value as well as the case of using the square operation value.

In case of the conventional comparison using the average value, the leakage signal level is often determined to be low despite the fact that the leakage signal level is high, so that the electrical leakage interruption does not respond. However, according to the wiring device 1 of the present preferred embodiment, the leakage determination is performed by comparing the square value of the leakage current to the predetermined threshold value, so that the detection level is not lowered even when the leakage current has a distorted waveform. As a result, the electrical leakage is interrupted with higher accuracy, so that the safety for the electrical leakage is improved. Moreover, the integrating circuit 45 can control the variation of the detection signal level of the leakage current which is instantly generated, so that the malfunction of the threshold determination unit 46 can be reduced and the unnecessary operation of the switching unit 2 can be avoided. In the present preferred embodiment, the commercial power supply is connected to the power supply unit 5 after passing the switching unit 2 (the load side), however, there is no influence on the leakage detection even when being connected before passing the switching unit 2.

Figure 6:
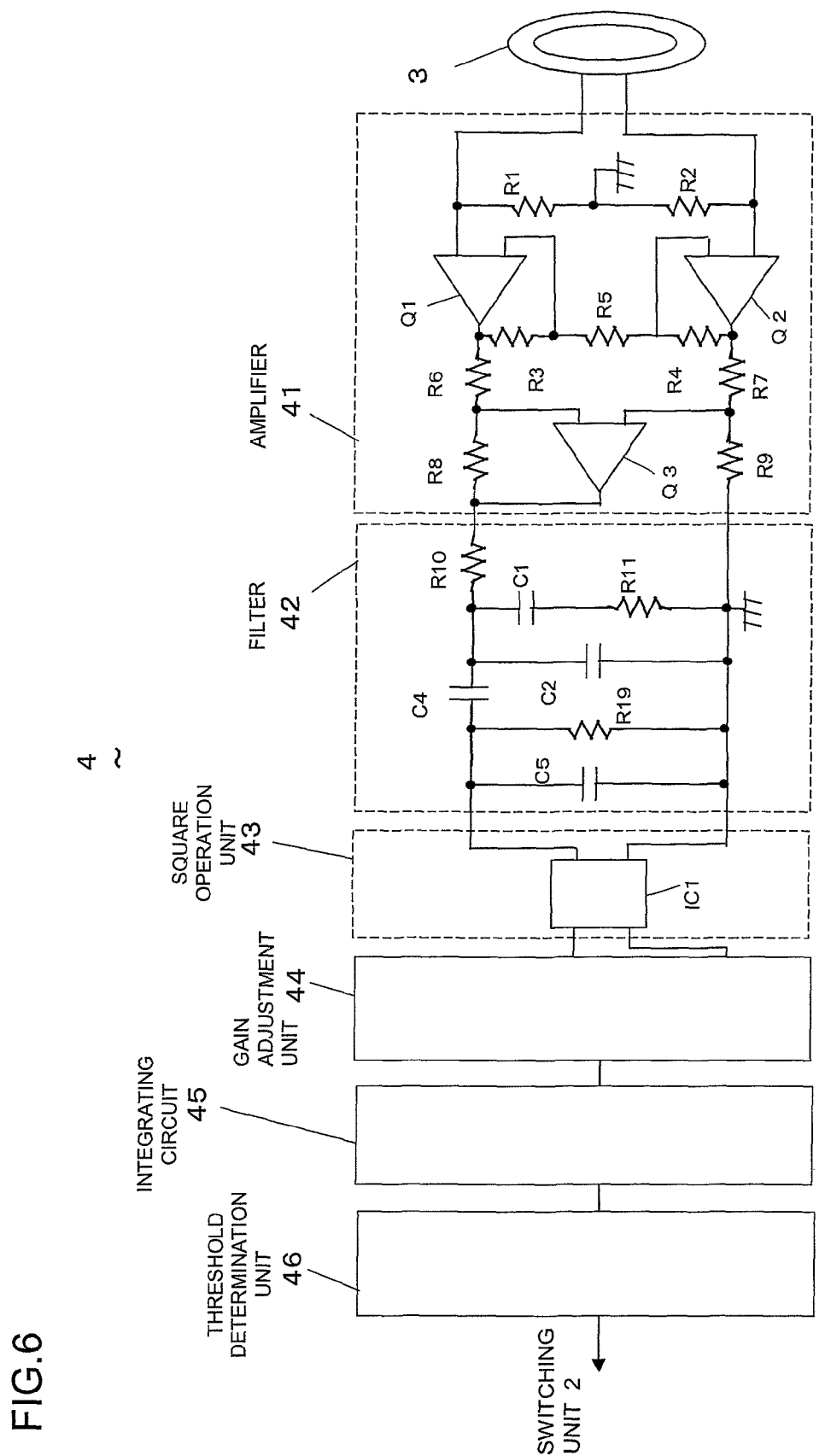
FIG. 6 is a configuration diagram of a leakage control unit in a wiring device according to a second preferred embodiment of the present invention.
Figure 7:
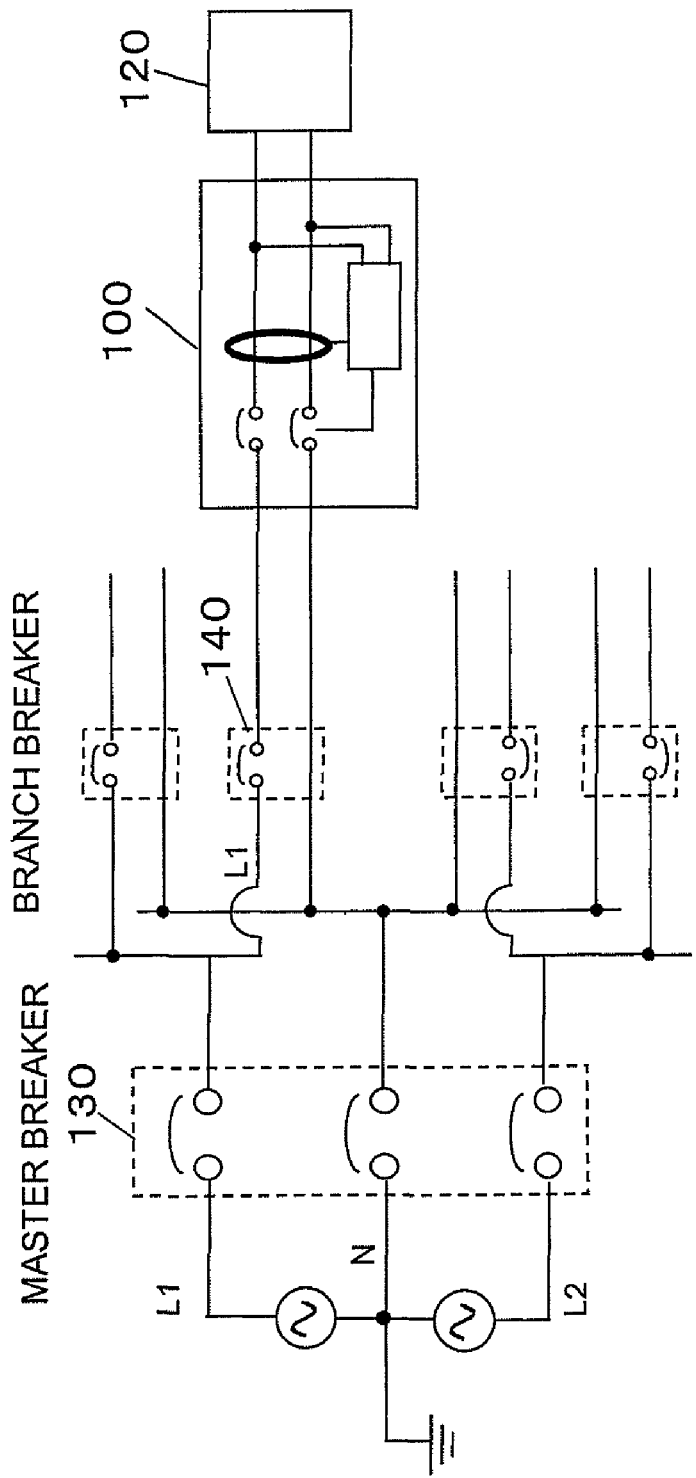
FIG. 7 is a circuit configuration diagram between a power supply and a load when a conventional wiring device is used.
Figure 8:
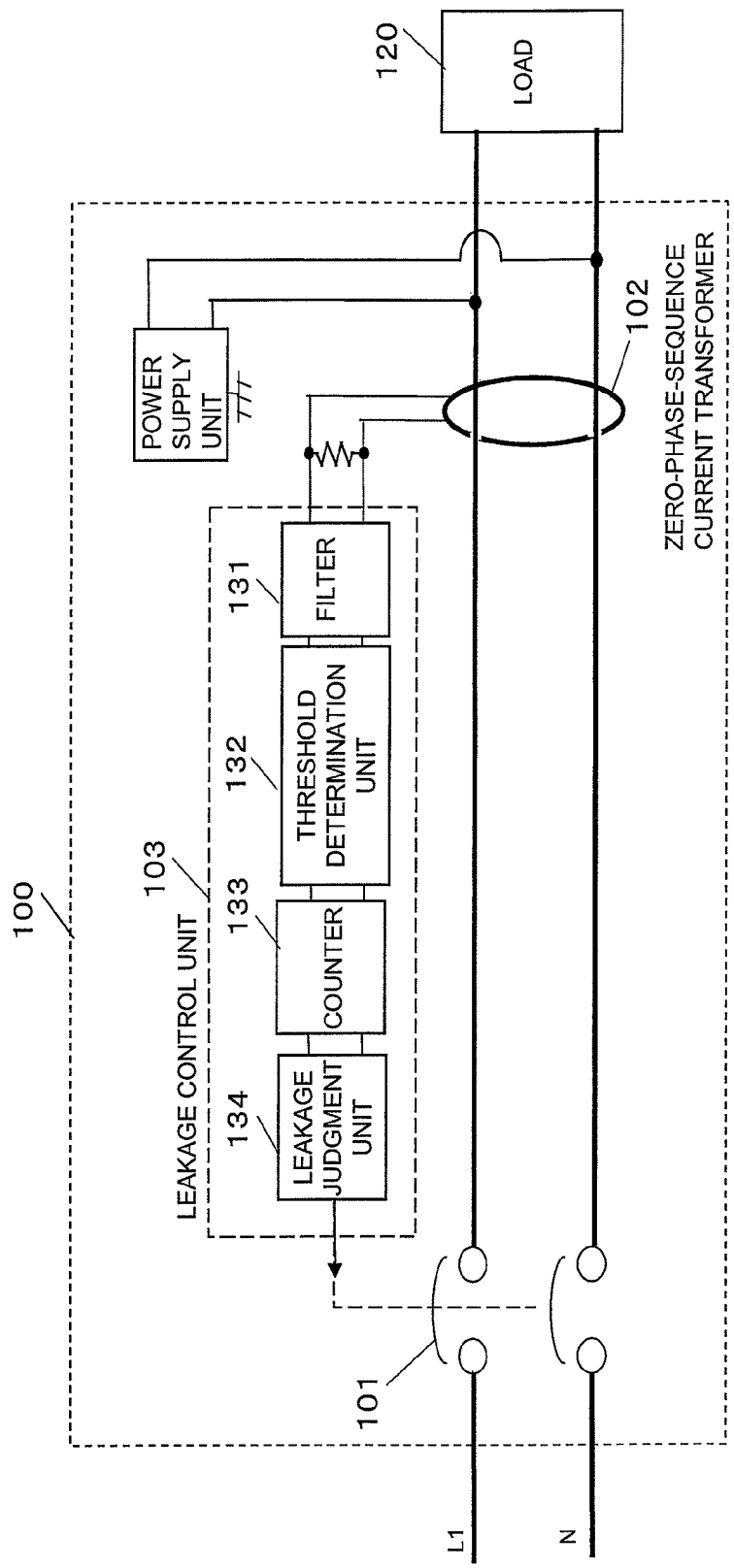
FIG. 8 is a configuration diagram of a conventional wiring device.
Figure 9:
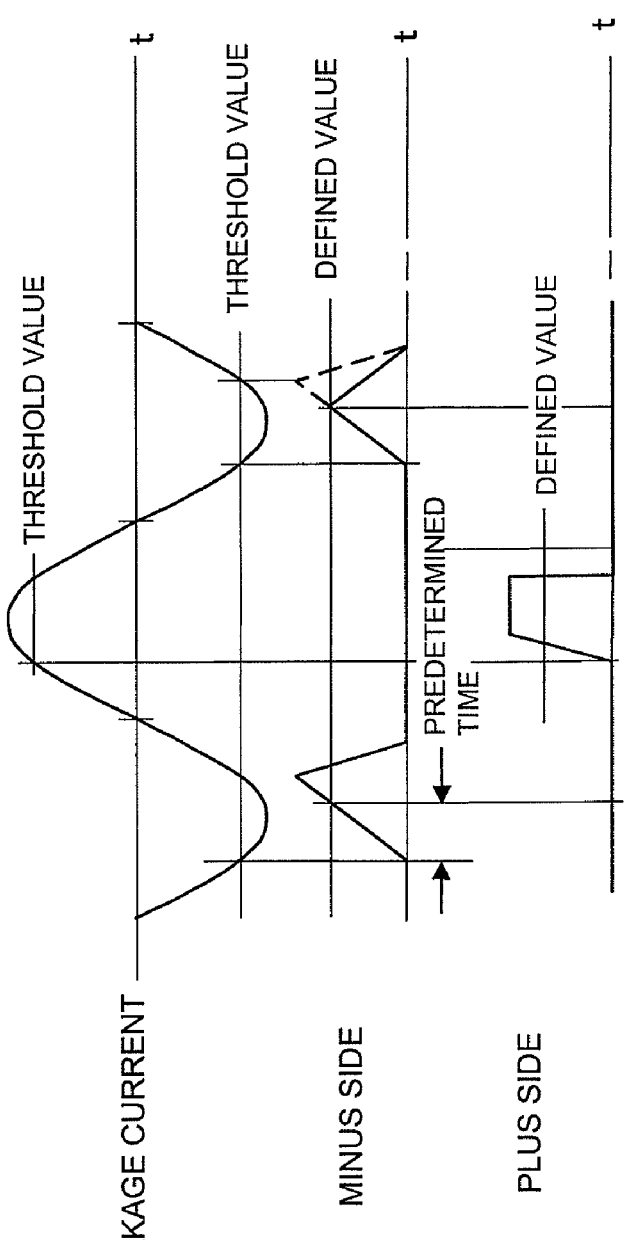
FIG. 9A is a waveform diagram of a leakage current in the wiring device in FIG. 8.
FIG. 9B is a diagram showing a minus side of the leakage current waveform in FIG. 9A.
FIG. 9C is a diagram showing a plus side of the leakage current waveform in FIG. 9A.
FIG. 9D is a diagram showing a trip signal.
Figure 10:
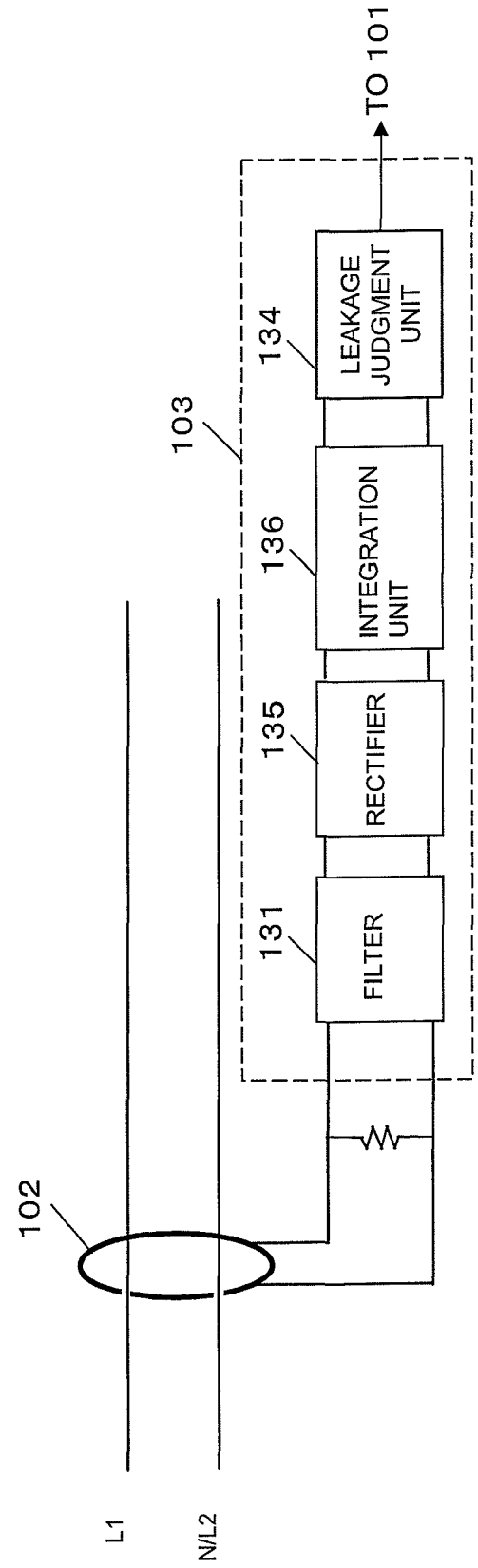
FIG. 10 is a configuration diagram of a leakage control unit in another conventional wiring device.
Figure 11:
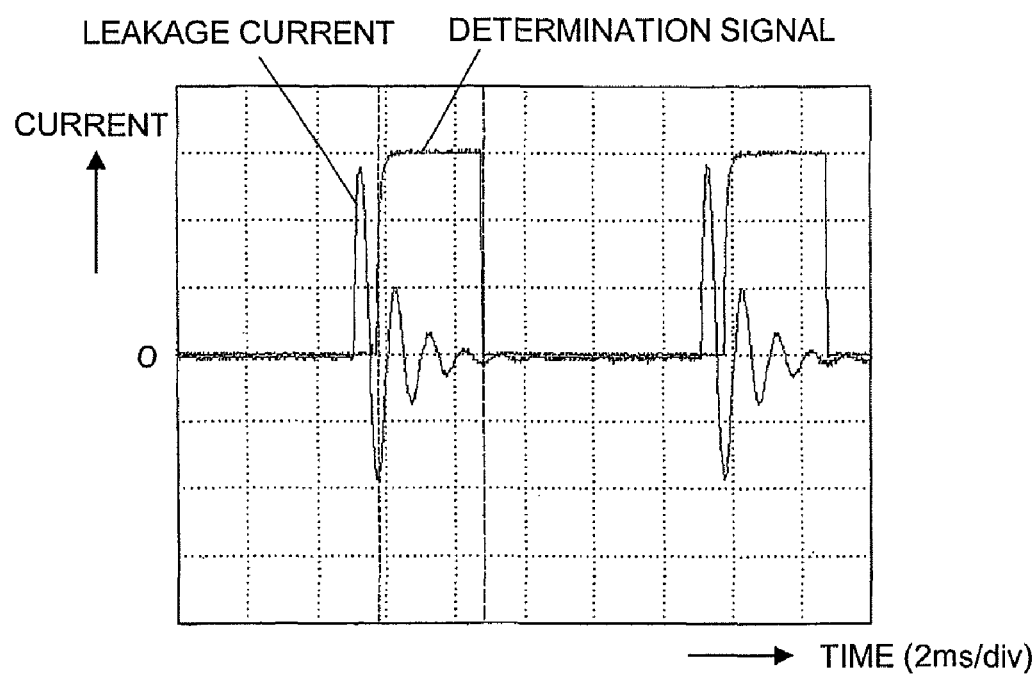
FIG. 11 is a waveform diagram of a leakage current in the wiring device in FIG. 10.

Next, a wiring device according to a second preferred embodiment of the present invention is described with reference to FIG. 6. FIG. 6 shows the leakage control unit 4 of the wiring device. In the present preferred embodiment, the filter 42 in the leakage control unit 4 has the DC (direct-current) cut function between the input and output. The other configuration is the same as that of the first preferred embodiment.

The filter 42 further has the capacitor C4 which is connected in series between the input resistor R10 and the input side of the square operation unit 43 of the next step to cut DC and a capacitor C5 and the resistor 19 which are respectively connected in parallel with each other between a terminal of the square operation unit 43 side of the capacitor C4 and a ground.

In the present preferred embodiment, a voltage division is performed on the leakage signal which is from the zero-phase-sequence current transformer 3 and amplified in the amplifier 41 by the resistor R10 and a parallel circuit, which is made up of the series circuit of the resistor R11 and the capacitor C1 and the capacitor C2, in the filter 42. The DC component of the signal on which the voltage division is performed is cut off when passing through the capacitor C4 which is connected in series with the resistor R10, and the signal whose DC component is cut off is inputted to the square operation unit 43. Here, the current value of approximately a few mA is an object of detection as the leakage current, so that the output of the zero-phase-sequence current transformer 3 is set to be low and the gain of the amplifier 41 is set to be relatively high. Thus, when the gain is high, a DC offset voltage which is generated in the operational amplifiers Q1 to Q3 increases, and the amplifier 41 outputs the leakage signal having a larger DC offset. Then, if the filter 42 does not have the DC cut function, the output signal from the amplifier 41 passes through the filter 42 without change and is performed of the square operation by the square operation unit 43 of next stage, so that the DC offset may be further increased. Accordingly, in order to miniaturize the DC offset, it is necessary to use an expensive amplifier with high DC offset accuracy for the amplifier 41 or provide an offset adjustment circuit for adjusting the offset.

However, in the present preferred embodiment, since the filter 42 has the DC cut function, the output from the filter 42 does not include the DC offset. Hence, it can be avoided that the DC offset influences to the leakage current detection level of next stage. As a result, the leakage detection accuracy is improved, and in addition, a circuit for adjusting the offset, for example, becomes unnecessary, so that the wiring device can be manufactured at low cost. Furthermore, even when having the DC cut function, the filter 42 can be made up with inexpensive components, that is to say, only the capacitor and resistor as a means of achieving the frequency characteristic for the electrical leakage detection.

The present invention is not limited to the configuration of the above preferred embodiment, however, various modification are applicable within the scope of the invention. For example, in the above preferred embodiments, the square operation by the square operation unit is performed with software, however, it can be performed with hardware, and an effective value arithmetic element or the like can also be used.

Moreover, the releasing relay is not limited to an electromagnetic relay, however, it can be other electrical relay such as a semiconductor relay, for example.

The present application is based on Japan Patent Application No. 2008-173082, and contents of the application are incorporated in the present application by reference.

What is claimed is:

1. A wiring device which has leakage detection functions and is located between a commercial power supply and a load, comprising;
   a leakage controller that detects a leakage current flowing through an electrical path connecting the commercial power supply and a load to perform a leakage determination: and
   a switch that interrupts the electrical path in accordance with the leakage determination of the leakage controller,
   wherein the leakage controller further comprises:
   a filter that removes high frequency components of the detected leakage current, the filter having a current-frequency characteristic corresponding to current waveforms that a human body perceives as aim electrical shock;
   a square operator that calculates a square value of a signal passing through the filter; and
   a determiner that performs the leakage determination by comparing the square value obtained by the square operator to preset threshold value.

2. The wiring device having the leakage detection function according to claim 1, wherein a current transformer is provided to detect the leakage current flowing in the electrical path.

3. The wiring device having the leakage detection function according to claim 2, wherein the leakage controller further comprising: an amplifier which differentially amplifies the leakage current provided from the current transformer and outputs to differentially amplified leakage current to the filter; a gain adjuster which performs a gain adjustment of the square value from the square operator; and an integrating circuit which integrates the gain adjusted square value and outputs the integration output to the determiner.

4. The wiring device having the leakage detection function according to claim 1, wherein the filter is made up of a capacitor and a resistor.

5. The wiring device having the leakage detection function according to claim 4, wherein the filter further has a capacitor which has a DC (direct-current) cut function.

6. The wiring device having the leakage detection function according to claim 5, wherein a zero-phase-sequence current transformer is provided to detect the leakage current flowing in the electrical path.

7. The wiring device having the leakage detection function according to claim 6, wherein the leakage controller further comprising: an amplifier which differentially amplifies the leakage current provided from the zero-phase-sequence current transformer and outputs the differentially amplified leakage current to the filter; a gain adjuster which performs a gain adjustment of the is square value from the square operator: and an integrating circuit which integrates the gain adjusted square value and outputs the integration output to the determiner.

* * * * *